(12) United States Patent
Shimizu et al.

(10) Patent No.: US 6,553,177 B1
(45) Date of Patent: Apr. 22, 2003

(54) INFORMATION RECORDING AND REPRODUCING SYSTEM

(75) Inventors: Yuji Shimizu, Saitama-ken (JP); Takayoshi Noguchi, Saitama-ken (JP); Takashi Irisawa, Saitama-ken (JP); Hidehiro Ishii, Saitama-ken (JP); Eiji Muramatsu, Saitama-ken (JP); Ichiro Higuchi, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/271,988

(22) Filed: Mar. 19, 1999

(30) Foreign Application Priority Data

Mar. 20, 1998 (JP) ............................... 10-072906

(51) Int. Cl.[7] ................................................. H04N 5/91
(52) U.S. Cl. ............................................................ 386/68
(58) Field of Search ........................ 386/46, 68, 70, 386/81, 82, 125, 126

(56) References Cited

U.S. PATENT DOCUMENTS

5,999,691 A * 12/1999 Takagi et al. ................... 386/46
6,233,390 B1 * 5/2001 Yoneda ........................ 386/46

FOREIGN PATENT DOCUMENTS

JP          10-9833          1/1998

* cited by examiner

*Primary Examiner*—Huy Nguyen
(74) *Attorney, Agent, or Firm*—Morgan, Lewis & Bockius LLP

(57) ABSTRACT

A desired catch-up time at which reproduction started after a start of recording of input information catches up the recording is set. Recording start time, present time and recording end time are detected. A rate of the reproduction necessary to catch up the recording at the set catch-up time is determined recording start time, present time, and recording end time. The recorded information is reproduced at a determined rate until the set catch-up time.

2 Claims, 4 Drawing Sheets

INFORMATION RECORDING AND REPRODUCING SYSTEM

BACKGROUND OF THE INVENTION

The present invention relates to an information recording and reproducing system capable of reproducing information from a recording medium and recording information to a recording medium, more particularly, to a system for controlling information reproduction and recording such that the both are simultaneously performed.

Conventionally, there has been widely used a VTR (video tape recorder) as an information recording and reproducing system capable of both recording and reproducing information such as a moving picture.

The conventional VTR stated above includes a head used to record and reproduce information on/from a video tape.

With the conventional constitution of the VTR, however, information is recorded and reproduced using one head and it is impossible to simultaneously record and reproduce information.

For that reason, if the information which has been recorded so far is to be reproduced from the start, it is necessary to either stop recording information and start reproducing or complete recording all of the information and then to reproduce it.

Considering the need stated above, the applicant of the present invention has already proposed a system for recording and reproducing information in an apparently simultaneous manner as Japanese Patent Application No. 10-9833. In the proposed information recording and reproducing system, image information on a TV program which is recording target information is digitally compressed to generate compressed data, the resultant compressed data is recorded on an optical disc, the compressed data thus recorded is read from the optical disc to be subjected to expansion processing corresponding to the compression processing and the data is outputted as a reproduction signal. In addition, using time to spare while waiting for compression/expansion processing, the recorded position and reproduced position on the optical disc are sequentially searched and recording/reproducing processing is performed, thereby realizing a function of apparently simultaneously recording and reproducing information. The proposed information recording and reproducing system makes it possible to reproduce the recorded TV program from time shifted from the recording start time by a predetermined period of time (which reproduction will be referred to as "time-shift reproduction" hereinafter).

Nevertheless, in the proposed information recording and reproducing system, reproduction start time is merely shifted and good convenience is not expected. For instance, if a user returns home at 10 p.m. with the reservation of recording a TV program set from 9 p.m. to 11 p.m. and the TV program being recorded is subjected to time-shift reproduction as stated above, then it takes time for reproduction from 10 p.m. to 12 p.m. Due to this, if the user needs to finish watching television by 11 p.m., he or she has to give up reproducing the information halfway.

SUMMARY OF THE INVENTION

An object of the present invention object is to provide an information recording and reproducing system for recording and reproducing information on and from a recording medium, characterized in that information is recorded apparently simultaneously with information being reproduced and that, if reproducing the already recorded information, an arbitrary reproduction rate is set to catch up with recording time to thereby provide improved convenience.

According to the present invention, there is provided an information recording and reproducing system having a compression circuit for compressing input information, recording means for recording the compressed information on an optical disc, a reproducing circuit for reproducing information read out from the optical disc, an expansion circuit for expanding the reproduced information, the system comprising, setting means for setting a desired catch-up time at which reproduction started after a start of recording of the input information catches up the recording, detecting means for detecting recording start time, present time and recording end time, determining means for determining a rate of the reproduction necessary to catch up the recording at the set catch-up time based on the detected recording start time, present time, and recording end time, reproducing means for reproducing the recorded information at a determined rate until the set catch-up time.

The reproducing means has means for reproducing the input information in a real time when there is a remaining time between the set catch-up time and the detected recording end time These and other objects and features of the present invention will become more apparent from the following detailed description with reference to the accompanying drawings.

DETAILED DESCRIPTION OF THE PREFERRED EMBODIMENT

Figure 1:
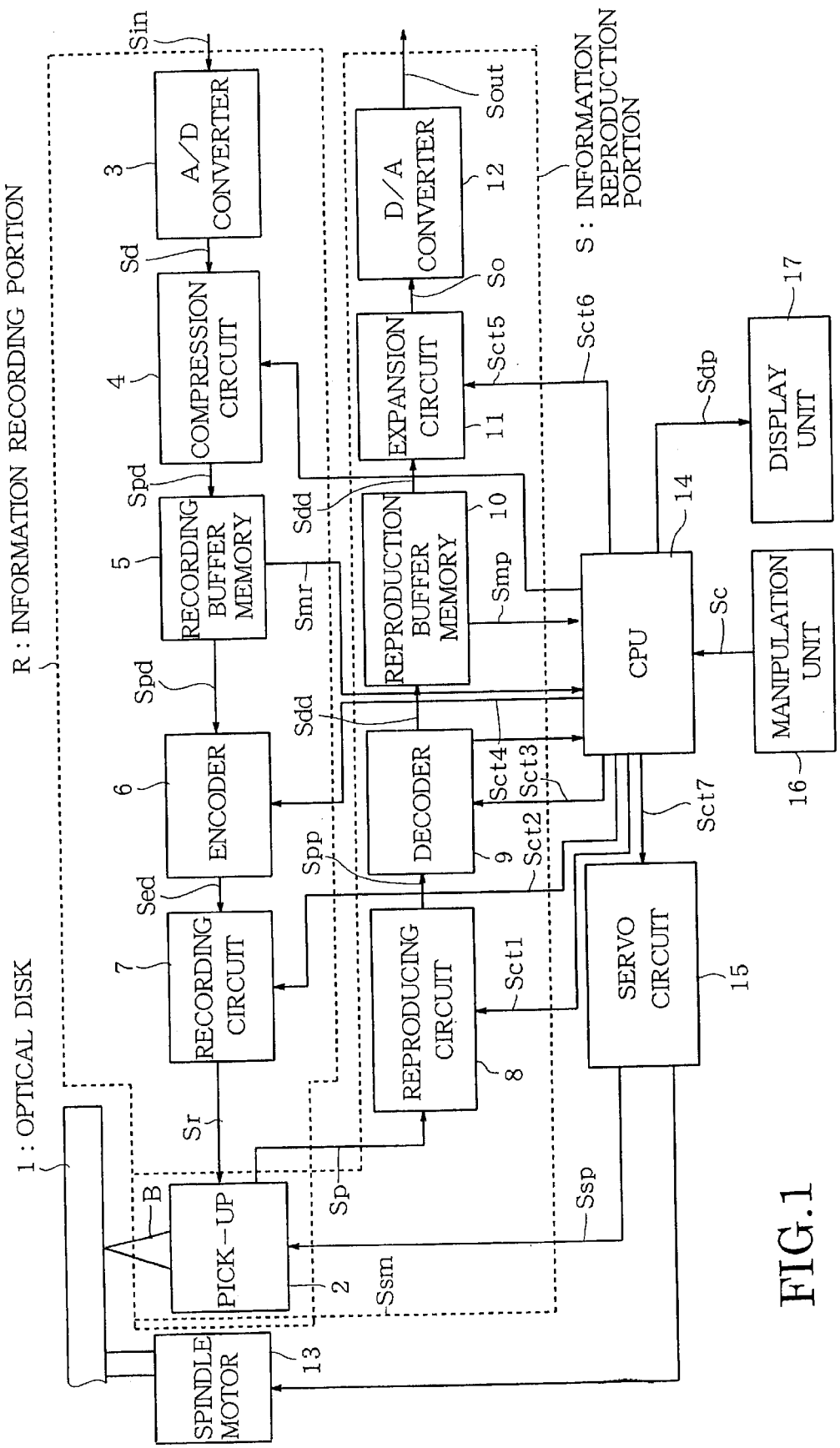
FIG. 1 is a block diagram showing an information recording and reproducing system according to the present invention.

Referring to FIG. 1, the constitution of an information recording and reproducing system will be described.

As shown in FIG. 1, the information recording and reproducing system in the embodiment consists of a pick-up 2 serving as recording and detecting means, an A/D converter 3, a compression circuit 4 serving as processing means, a recording buffer memory serving as recording information storage means, an encoder 6, a recording circuit 7, a reproducing circuit 8, a decoder 9, a reproduction buffer memory 10 serving as storage means, an expansion circuit 11 serving as reprocessing means, a D/A converter 12, a spindle motor 13, a CPU 14 serving as control means, a servo circuit 15, a manipulation unit 16 and a display unit 17.

In those constituent elements, the pick-up 2, A/D converter 3, compression circuit 4, recording buffer memory 5, encoder 6 and recording circuit 7 constitute an information recording part R serving as information recording means.

The pick-up 2, reproduction circuit 8, decoder 9, reproduction buffer memory 10, expansion circuit 11 and D/A converter 12 constitute an information reproduction part P serving as information reproducing means.

The operation of the information recording and reproducing system with the above-stated constitution according to the present invention will be outlined.

First, description will be given to the optical disc 1 serving as a recording medium for recording external information to be recorded on the optical disc 1.

A user manipulates the manipulation unit 16. When an information signal $S_{in}$ (analog signal) corresponding to the information to be recorded externally (which includes image information and/or audio information) is inputted, the A/D converter 3 digitizes the information signal $S_{in}$ to generate a digital information signal $S_d$ of preset input rate Mr and outputs the signal $S_d$ to the compression circuit 4.

The compression circuit 4 compresses the inputted digital information signal $S_d$ based on a control signal $S_{ct5}$ fed from the CPU 14, generates a compressed information signal $S_{pd}$ and applies the signal $S_{pd}$ to the recording buffer memory 5. In the compressing of the digital information signal $S_d$, a compression system such as a MPEG2 (Moving Picture coding Expert Group 2) system is used if the digital information signal $S_d$ is a moving picture.

The recording buffer memory 5 temporarily stores the inputted compressed information signal $S_{pd}$. At that time, the recording buffer memory 5 applies a data quantity signal $S_{mr}$ indicating the quantity of data of the stored compressed information signal $S_{pd}$ to the CPU 14.

Thereafter, the encoder 6 encodes the compressed information signal $S_{pd}$ read from the recording buffer memory 5 at a higher reading rate $R_r$ than the input rate Mr of the digital information signal $S_d$ based on a control signal $S_{ct4}$ fed from the CPU 14, and feeds an encoded signal $S_{ed}$ to the recording circuit 7.

The recording circuit 7 converts the inputted encoded signal $S_{ed}$ into a recording signal $S_r$ based on a control signal $S_{ct2}$ fed from the CPU 14 and supplies the recording signal $S_r$ to the pick-up 2. At that time, the recording circuit 7 performs so-called write strategy processing to the encoded signal $S_{ed}$ to form pits shaped accurately conforming to the information to be recorded on the optical disc 1 which will be described later.

The pick-up 2 drives a light source such as a semiconductor laser (not shown) provided therein based on the recording signal $S_R$ fed from the recording circuit 7, applies a light beam B such as a laser beam onto the information recording surface of the optical disc 1, and records the information signal $S_{in}$ on the optical disc at a rate corresponding to the above-stated recording rate $R_r$. The optical disc 1 is rotated at a predetermined rotation rate by the spindle motor 13 driven on the basis of a spindle control signal $S_{sm}$ as described later. It is noted that a pit corresponding to the recording signal $S_r$ is formed by means of phase change system on the optical disc 1.

The operation for reproducing the information recorded on the optical disc 1 will be described.

In reproduction, the pick-up 2 applies a light beam B for reproduction onto the rotating optical disc 1, generates a detecting signal $S_p$ corresponding to the pit formed on the optical disc 1 at a detecting rate $R_p$ based on a reflected light, and feeds the detecting signal $S_p$ to the reproducing circuit 8.

The reproducing circuit 8 amplifies the detecting signal $S_p$ at a predetermined amplification rate based on a control signal $S_{ct1}$ fed from the CPU 14, rectifies the waveform of the signal $S_p$, and supplies a reproduction signal $S_{pp}$ to the decoder 9.

The decoder 9 decodes the reproduction signal $S_{pp}$ by means of a decoding system corresponding to the encoding system as in the encoder 6 based on a control signal $S_{ct3}$ fed from the CPU 14, generates a decoded signal $S_{dd}$ and feeds the signal $S_{dd}$ to the reproduction buffer memory 10 at a rate corresponding to the detection rate $R_p$.

The reproduction buffer memory 10 temporarily stores the decoded signal $S_{dd}$. During the storing, the reproduction buffer memory 5 supplies a data quantity signal $S_{mp}$ indicating the quantity of data of the decoded signal $S_{dd}$ to the CPU 14.

The expansion circuit 11 reads the decoded signal $S_{dd}$ stored in the reproduction buffer memory at a low output rate $M_p$ equal to or lower than the detection rate $R_p$ of the detection signal $S_p$ based on a control signal $S_{ct6}$ from the CPU 14. The expansion circuit 11 conducts expansion processing, corresponding to the compression processing in the compression circuit 4, to the decoded signal $S_{dd}$, and feeds an expanded signal $S_o$ to the D/A converter 12.

The D/A converter 12 converts the expanded signal $S_o$ to an analog signal, and supplies an output signal $S_{out}$ corresponding to the information signal $S_{in}$ to the outside.

On the other hand, the CPU 14 feeds a control signal $S_{ct7}$ for servo-controlling the spindle motor 13 and the pick-up 2 to the servo circuit 15. The servo circuit 15 feeds the spindle control signal $S_{sm}$ for controlling the rotation of the spindle motor 13 based on the control signal $S_{ct7}$ to the spindle motor 13. The servo circuit 15 also feeds a pick-up control signal $S_{sp}$ for focus-servo control to the pick-up 2. While conducting tracking servo control and focus servo control to the light beam B based on the pick-up control signal $S_{sp}$, the pick-up 2 records the recording signal $S_r$ (information signal $S_{in}$) or detects the detection signal $S_p$. Besides, information necessary for the user to control the operation of the information recording and reproducing system S is displayed on the display unit 17 based on a display signal $S_{dp}$ from the CPU 14.

Figure 2:
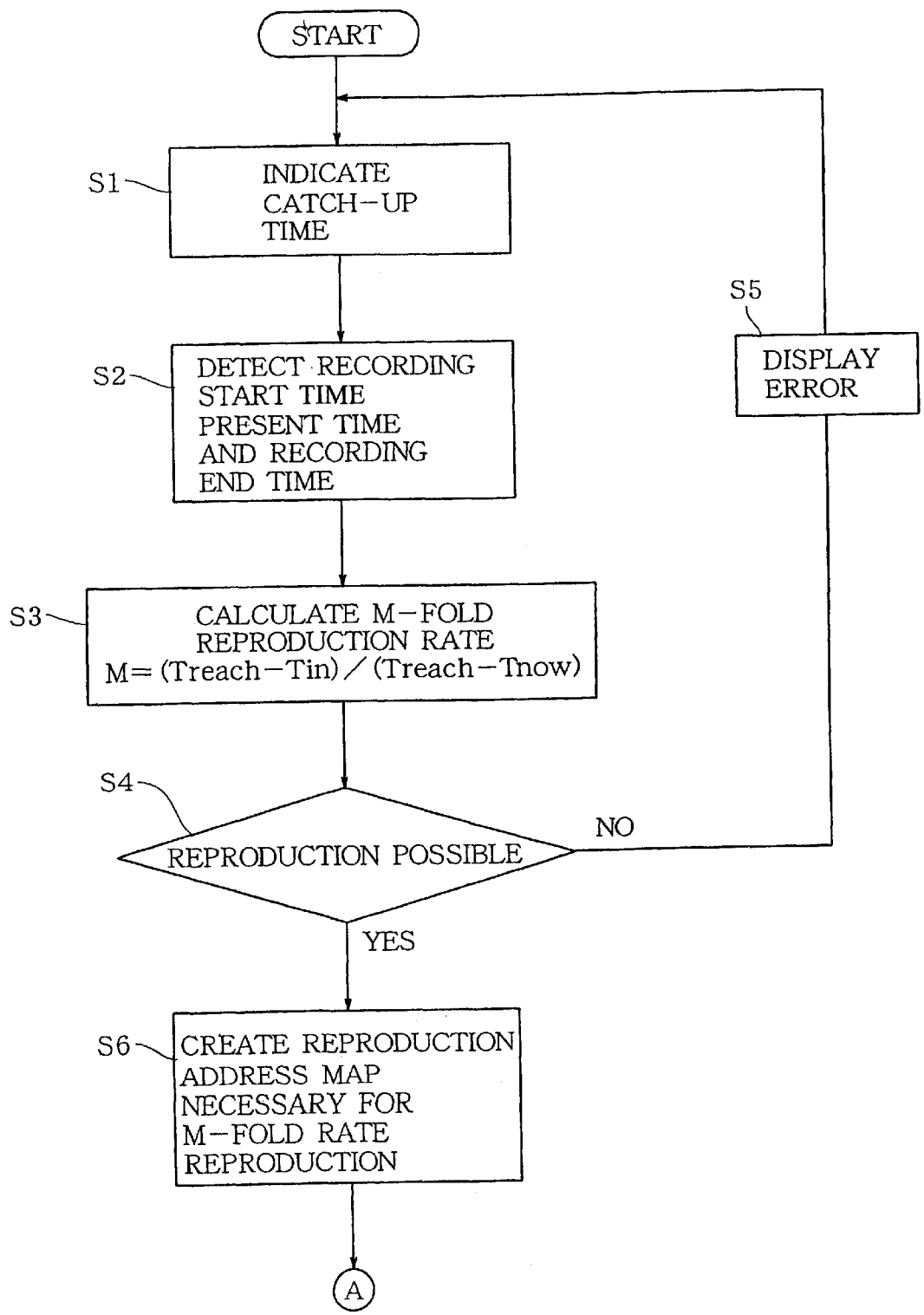
FIG. 2 is a flow chart showing information recording and reproducing operation.
Figure 3:
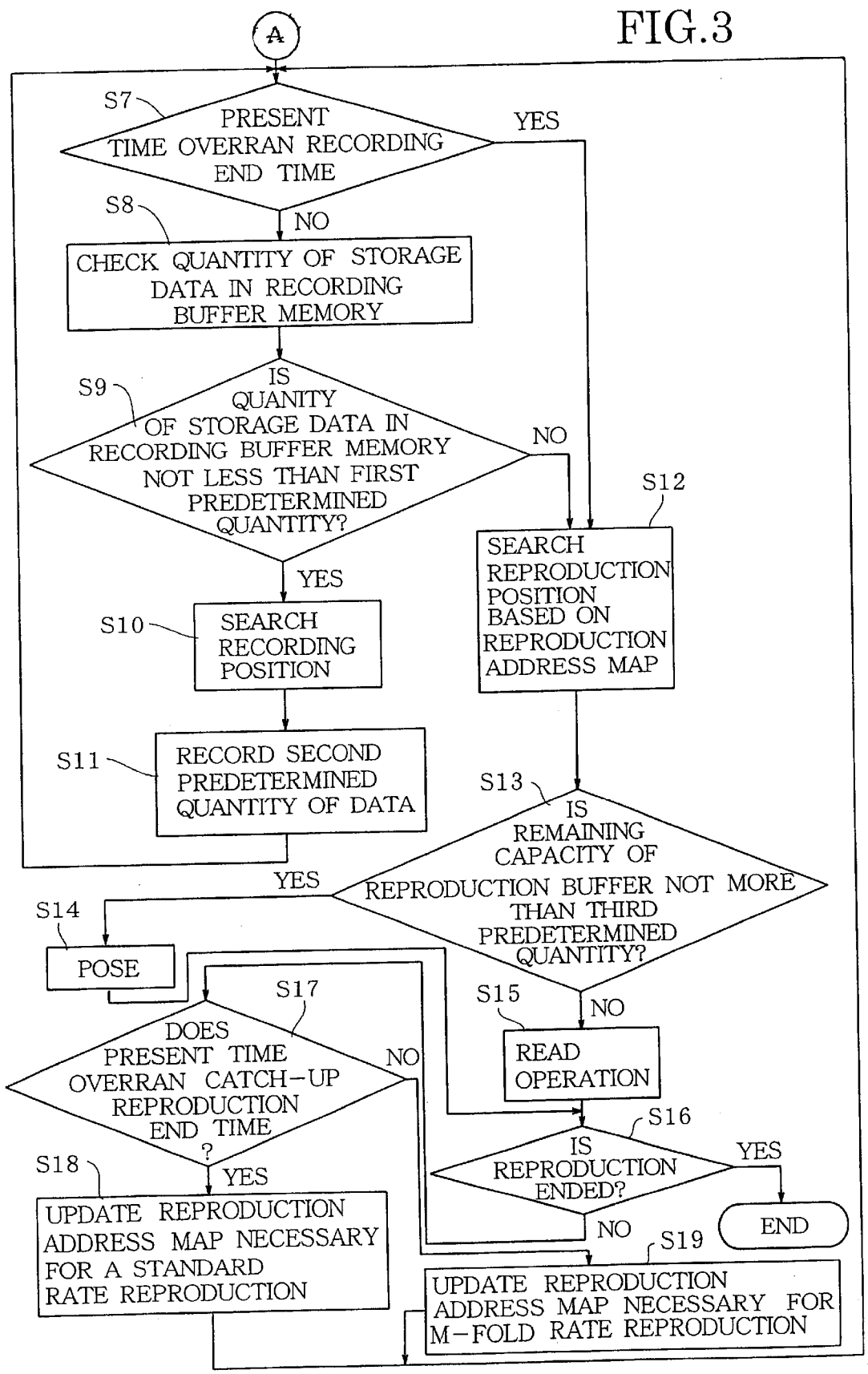
FIG. 3 is a flow chart following that of FIG. 2 for showing information recording and reproducing operation.

Description will now be given to simultaneous recording and reproducing control in the above-described information recording and reproducing system S with reference to FIGS. 2 and 3.

In the information recording and reproducing system S, the user manipulates the manipulation unit to set desired catch-up time $T_{reach}$ at which the reproduction will catch up the recording at the set catch-up time $T_{reach}$. The CPU 14 detects recording start time $T_{in}$ at which information recording starts and checks the present time $T_{now}$ and information recording end time $T_{out}$ (step S2). Based on those conditions, the CPU calculates an M-fold reproducing rate necessary to catch up the recording with the designated time $T_{reach}$ using the following formula (step S3):

$$M = (T_{reach} - T_{in})/(T_{reach} - T_{now})$$

Here, the upper limit of the information reproducing rate and the other is pre-set. Under those conditions, it is determined whether or not the catch-up time $T_{reach}$ for information reproduction can be set up (step S4). If setting is impossible, an error is displayed on the display unit 17 (step S5) and different catch-up time $T_{reach}$ is set in the unit 16 (step S1), thereby repeating the steps S1 through 4. Conversely, if it is determined that it is possible to set the reproduction mode at M (step S4), the CPU 14 creates a reproduction address map necessary for M-fold reproduction rate (step S6).

The reproduction address map is created based on concentrated information recorded on a specified region of the optical disc 1 during recording operation. In this embodiment, the concentrated information is provided as a recording position (or address) on the optical disc 1 on which corresponding information, for example, per second when converting recorded information into reproduction time thereof (which is passage time if the recorded information is reproduced at a standard rate). The concentrated information is updated (or added) every time new information is recorded. Therefore, if M is computed as 2 at the step S3, that is, if it is a double reproduction rate, then, the CPU 19 extracts a pair of the start and end addresses per second through all of the information to be reproduced (which is the recorded TV program or information already recorded in this embodiment) at one-second intervals and builds and stores the addresses as a reproduction address map in an internal memory (not shown).

In this embodiment, the compressed information signal $S_{pd}$ is generated by means of, for example, the MPEG2 compression system. Using such ordinary compression system, differential information with a previous image plane is recorded as information data and the quantity of data, therefore, varies with the information (or a picture) to be recorded. For instance, if the recorded information is a static image, the differential information with the previous image planes is zero over one frame (one image plane). In case of scene changing information, differential information is generated over one frame. Thus, the quantity of actually recorded data varies with the information to be recorded. Even if different pieces of information are converted to the same reproduction time of one second, they differ in the quantity of data actually reproduced from the optical disc 1. In other words, unlike an optical disc, such as a laser disc, on which analog information is recorded, the addresses and reproduction time for the recorded information do not satisfy linear relationship between them in the optical disc. That is the concentrated information is required to associate the actually recorded information with reproduction time.

The operation of executing information recording at the steps S7 through S11 of FIG. 3 will be described.

Figure 4:
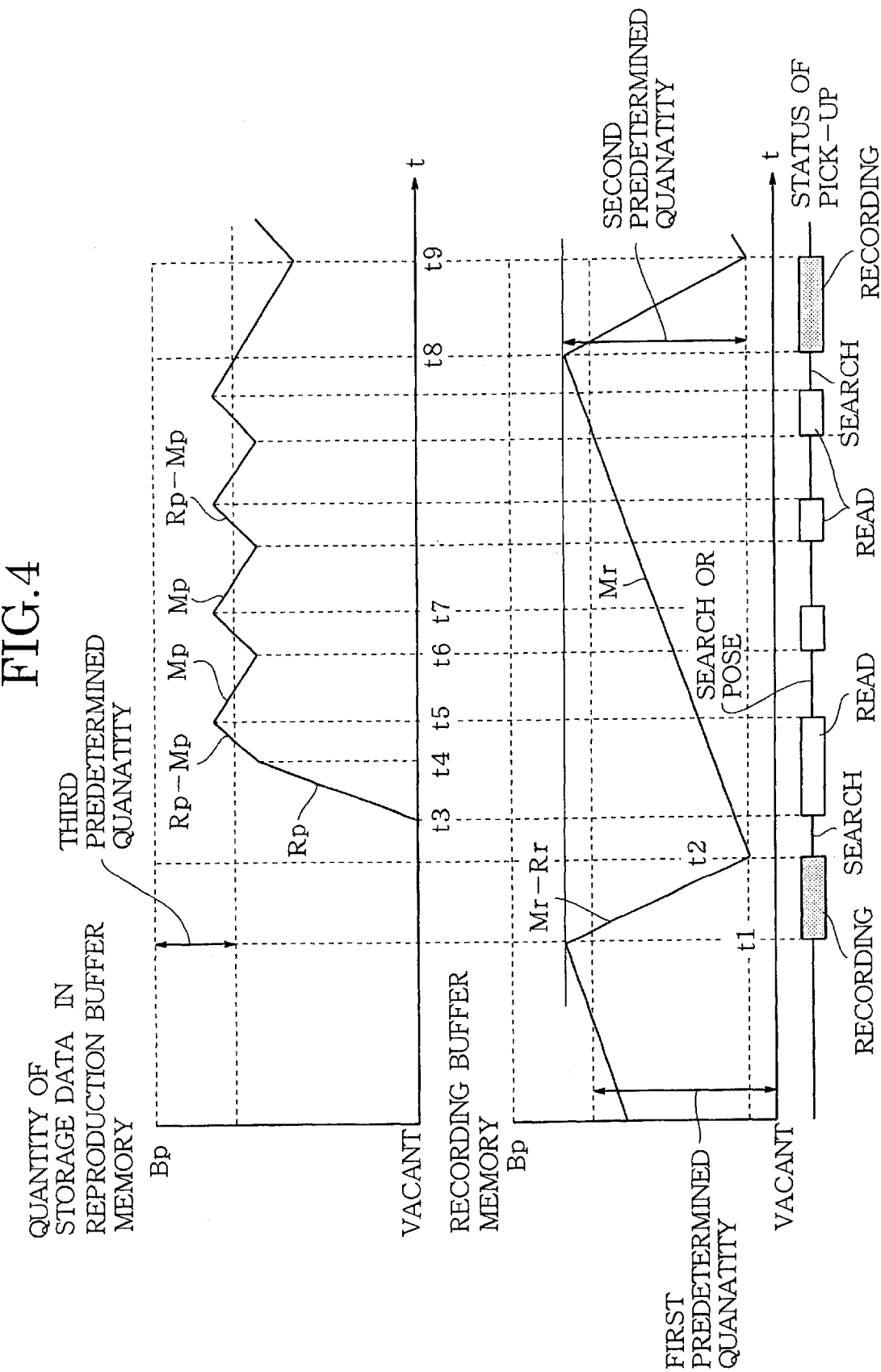
FIG. 4 is a graph showing changes of data stored in a buffer memory.

When the CPU 14 creates a reproduction address map necessary for M-fold speed reproduction (step S6), it is determined whether or not the present time overran the information recording end time $T_{out}$ (step S7). If the present time does not overran the information recording end time $T_{out}$, the CPU 14 checks the quantity of storage data using the data quantity signal $S_{mr}$ from the recording buffer memory 5 (which capacity is Br in FIG. 4) (step S8). It is determined whether or not the data storage quantity in the recording buffer memory 5 exceeds a first predetermined quantity or not as shown in FIG. 4 (step S9).

If it is determined that the storage quantity of the recording buffer memory 5 is more than the first predetermined quantity (step S9), the recording position of the optical disc 1 on which the encoded signal $S_{ed}$ is recorded is searched (step S10) and a second predetermined quantity of data is recorded through the pick-up 2. At that time, the recording buffer memory 5 stores the digital signal $S_d$ obtained by A/D converting the information signal $S_{in}$ to be recorded, the compression-processed compression information signal $S_{pd}$ following the digital signal $S_d$ in the recording buffer memory 5 at a preset input rate of Mr. Thus, normally, the quantity of storage data is increased at the input rate Mr. If the second predetermined quantity of data is recorded on the optical disc 1 at the recording rate Sr, the quantity of storage data in the recording buffer memory 5 is decreases at a rate R indicated by the following formula.

$$R=(\text{Input rate } Mr)-(\text{Recording rate } Rr).$$

When the quantity of storage data reaches the first predetermined quantity while data is stored in the recording buffer memory 5 at the input rate Mr until the set information recording end time, the recording buffer memory 5 repeatedly decreases the second predetermined quantity at a rate of R=Mr−Rr.

The first predetermined quantity is defined as that at which the recording buffer memory 5 is not full even if compression information signals $S_{pd}$ are continuously stored in the recording buffer memory 5 at the input rate Mr from the determination at the step S9 until the movement of the pick-up 2 is completed and the recording of the recording signal $S_r$ starts at a step S110 based on the capacity Br of the recording buffer memory 5. In addition, the second predetermined quantity may be the same as the first predetermined quantity. Alternatively, it may be more than the first predetermined quantity to discharge all of the compression information signals $S_{pd}$ stored in the recording buffer memory 5 in consideration of the quantity of compression information signals $S_{pd}$ newly stored in the recording buffer memory 5 while searching the recording position or recording the recording signal $S_r$.

Furthermore, the operation of executing information reproduction at steps S12 through S19 will be described.

As described above, it is determined whether or not the present time overran the information recording time $T_{out}$, at the step S7. If the present time exceeds the information recording time $T_{out}$ and the quantity of storage data in the recording buffer memory 5 is less than the first predetermined quantity, the position on the optical disc 1 on which the recording signal $S_r$ to be reproduced is recorded, is searched in response to the command from the CPU 14 which is issued based on the reproduction address map provided at the step S6 to start reproducing information and the light spot of the light beam B is moved to the searched position (step S12). As will be described later, the decoded signals $S_{dd}$ are stored in the reproduction buffer memory 10 at the detecting rate of $R_p$ and the stored decoded signals $S_{dd}$ are read at the output rate of $M_p$. It is determined whether or not the remaining capacity of the reproduction buffer memory 10 (which capacity is Bp) is not more than a third predetermined quantity (step S 13). The third predetermined quantity is, for example, the quantity of data equal to that of one ECC block in the decoded signal $S_{dd}$. If the remaining capacity of the reproduction buffer memory 10 is not more than the third predetermined quantity, the pick-up 2 is temporarily stopped (or search-posed), the generation of the detection signal Sp is stopped (step S14) and program goes to a step S16. As described above, at that time, the information signal $S_{in}$ is being inputted, the compression signal $S_{pd}$ is being stored in the recording buffer memory 5 following the input of the information signal $S_{in}$, and the decoded signal $S_{dd}$ is being outputted from the reproduction buffer memory 10 and the output signal $S_{out}$ is being outputted from the D/A converter following the output of the decoded signal $S_{dd}$. On the other hand, if it is determined that the remaining capacity of the reproduction buffer memory 10 is above the third predetermined quantity, information read operation is executed (step S15).

At the step S16, it is determined whether or not all of the information to be reproduced has been reproduced. If the reproduction of all of the information is completed, the operation is ended. If the reproduction of all of the information is not completed, it is determined whether or not the present time overran the preset catch-up reproduction end time $T_{reach}$ (step S17). If the present time overran the reproduction end time $T_{reach}$, information does not need to be reproduced at the M-fold reproduction rate and the reproduction address map necessary for a standard reproduction rate is updated at a step S18. If the present time does not overran the reproduction end time $T_{reach}$, the reproduction address map necessary for M-fold speed reproduction is updated at a step S19 and processing returns to the step S7.

The reason why the reproduction address map needs to be updated is as follows. The above-described concentrated information is updated (or added) to the newly recorded information at the steps S7 through S11 and it is, therefore, necessary to update the reproduction address map based on the updated concentrated information.

Next, the information reproduction and recording described with reference to the flow charts of FIGS. 2 and 3 will be further described, while centering around changes of the quantities of storage data in the recording buffer memory 5 and the reproduction buffer memory 10 with reference to FIG. 4. FIG. 4 shows changes of the respective quantities of storage data if an information reproduction command is issued during information recording operation. In addition, in FIG. 4, in those portions indicating the status of the pick-up 2, a detection signal $S_p$ is being detected in time zones indicated as blank regions and a recording signal $S_r$ is being recorded in time zones indicated by hatching lines.

Although the quantity of storage data in the recording buffer memory 5 is already described above, the recording buffer memory 5 continuously stores compressed information signals $S_{pd}$ at the input rate Mr. Normally, the quantity of storage data increases at the input rate Mr. If it is determined that the quantity of storage data in the recording buffer memory 5 is not less than the first predetermined quantity at the step S9 (at time t1 and t8 in FIG. 4), the encoded signals Sed encoded are recorded on the optical disc 1 through the pick-up 2 at the recording rate Rr and the second predetermined quantity of data is recorded on the optical disc 1 (at time t2 and t9). Therefore, if the quantity of storage data normally increases at the input rate of Mr and the second predetermined quantity of data is recorded using the recording signals $S_r$ on the optical disc 1, the quantity of storage data in the recording buffer memory 5 decreases at a rate R indicated by the following formula.

$$R = (\text{Input rate } Mr) - (\text{Recording rate } Rr).$$

If data is stored in the recording buffer memory 5 at the input rate Mr until the set information recording end time and the quantity of storage data reaches the first predetermined quantity, the recording buffer memory 5 repeatedly decreases the second predetermined quantity at the rate R=Mr−Rr.

Next, description will be given to the change of the quantity of storage data in the reproduction buffer memory 10 with reference to FIG. 4. If a command to reproduce information is issued during recording operation (step S12), the information reproduction starts at the information reproduction start time t3. Decoded signals $S_{dd}$ corresponding to the detection signals $S_p$ are stored in the reproduction buffer memory 10 at the detection rate $R_p$. At time t4 on the way, the decoded signals $S_{dd}$ are actually produced from the reproduction buffer memory 10 at the output rate of $M_p$.

Thus, from the time t4, the capacity of the reproduction buffer memory 10 increases at a rate R' indicated by the following formula.

$$R' = (\text{Detection rate } R_p) - (\text{Output rate } M_p).$$

If it is determined that the remaining capacity of the reproduction buffer memory 10 is not more than the third predetermined quantity at the step S13 (at time t5), the detection of the recording signals $S_r$ is stopped and only the output of the output signals $S_{out}$ is executed at the output rate $M_p$. Meanwhile, if it is determined that the remaining capacity thereof is not less than the third predetermined quantity (at time t6), the detection of the recording signals $S_r$ starts at the detection rate $M_p$ so that the quantity of storage data in the reproduction buffer memory increases again at the rate $R' = R_p - M_p$.

As described above, if only the information reproduction is executed (at the output rate $M_p$), the quantity of storage data varies to the extent that the remaining capacity falls within the range of the quantity of data equal to or less than the above-described minimum decode unit. In other words, when the remaining capacity becomes equal to or more than the third predetermined quantity at time t6, the detection of the recording signals $S_r$ is started (at the detection rate $R_p$) so that the quantity of storage data in the reproduction buffer memory 10 increases at the rate of $R'=R_p-M_p$. Thereafter, when the remaining capacity becomes less than the third predetermined quantity, the detection of the recording signals $S_r$ is stopped at time t7 and only the output of the output signals $S_{out}$ is executed at the output rate $M_p$. This processing is repeatedly carried out.

At time t8 and t9 at which recording signals $S_r$ are recorded using the pick-up 2, the recording signals are not detected but the decoded signals $S_{dd}$ continues to be read from the reproduction buffer memory 10 at the output rate $M_p$. Thereafter, the operation from t4 to t7 is repeated (steps 13, 14 and 15).

As described above, according to the information recording and reproducing system S, the recording signals $S_r$ which have been recorded on the optical disc 1 until that time are reproduced at the M-fold reproduction rate and, at the same time, non-recorded recording signals $S_r$ are continuously recorded by the information continuously inputted from the external unit. Seeing the information recording and reproducing system S as a whole, information recording can be apparently performed in a simultaneous manner with the reproduction of information recorded at the M-fold reproduction rate. Finally, the information reproduction catches up with the information recording, thereby making it possible to reproduce the external information in real time.

Accordingly, if the user returns home at p.m. 10 with the reservation of recording of a TV program set from p.m. 9 to p.m. 11, it still takes time from p.m. 10 to p.m. 12 for time-shift reproduction. If the user wants to finish watching the recorded program by p.m. 11, the following three settings may be done, for example. They can be appropriately selected in accordance with the degree of user's need.

(1) The catch-up time $T_{reach}$ is set at p.m. 11 and picture (or information) reproduction is finished simultaneously with the end of picture (information) recording. In this case, a reproduction rate is set at a double rate.

(2) If reproduction catch-up time $T_{reach}$ is set at p.m. 10:30, the user needs to finish watching the program which has been recorded for 1.5 hours in half an hour. In this case, if a reproduction rate is set at 90 min/30 min=a threefold reproduction rate, reproduction catches up with recording by p.m. 10:30. Thereafter, the reproduction process may be continued or the user may watch another TV program currently on air without recording the program for the remaining 30 minutes.

(3) If the user watches the program from the already recorded portion at a six-fold reproduction rate, reproduction is executed while greatly skipping the content of the program. In this case, reproduction catches up with recording in 12 minutes and the user can watch the program in real time without the need to record it for the remaining 48 minutes. In that case, it is possible to continue recording the program.

The above-described embodiment has been described, taking a case of using the optical disc 1 as a recording medium as an example. The present invention should not be limited to the above and may be applied to a random-access recording medium capable of reading and writing information such as, for example, a semiconductor memory.

Moreover, in the embodiment, description is given to a case where the present invention is applied to an information recording and reproducing system including compression and expansion processing. The present invention may also be widely applied to an information recording and reproducing system capable of reproducing information at an arbitrarily chosen M-fold reproduction rate as long as the system is designed such that the rate at which information is inputted externally is lower than the recording rate at which the information is recorded on a recording medium and the rate at which the information is detected from the recording medium is higher than the rate at which the information is outputted externally. Furthermore, reproducing methods may imply that for skipping specific recording portions and shortening reproduction time as long as reproduction time can be changed.

In accordance with present the invention, while continuously recording information on a single recording medium, the content of the information recorded on the recording medium can be checked by setting an arbitrary recording method using means for determining the reproduction method. It is, therefore, possible to efficiently use information recording time for reproduction, to shorten reproduction time and to execute information reproduction and recording simultaneously. As a result, it is possible to enhance the convenience of the information recording and reproducing system.

While the invention has been described in conjunction with preferred specific embodiment thereof, it will be understood that this description is intended to illustrate and not limit the scope of the invention, which is defined by the following claims.

What is claimed is:

1. An information recording and reproducing system comprising:

setting means for setting a desired catch-up time at which reproduction started after a start of recording of the input information catches up the recording;

detecting means for detecting recording start time, present time and recording end time;

determining means for determining a rate of the reproduction necessary to catch up the recording at the set catch-up time based on the detected recording start time, present time, and recording end time;

reproducing means for reproducing the recorded information at a determined rate until the set catch-up time.

2. The system according to claim 1 wherein the reproducing means has means for reproducing the input information in a real time when there is a remaining time between the set catch-up time and the detected recording end time.

* * * * *